US008838937B1

(12) United States Patent
Katz et al.

(10) Patent No.: US 8,838,937 B1
(45) Date of Patent: Sep. 16, 2014

(54) METHODS, SYSTEMS AND COMPUTER READABLE MEDIUM FOR WRITING AND READING DATA

(75) Inventors: Michael Katz, Haifa (IL); Hanan Weingarten, Herzelia (IL)

(73) Assignee: Densbits Technologies Ltd., Haifa (IL)

( * ) Notice: Subject to any disclaimer, the term of this patent is extended or adjusted under 35 U.S.C. 154(b) by 248 days.

(21) Appl. No.: 13/478,706

(22) Filed: May 23, 2012

(51) Int. Cl.
*G06F 9/26* (2006.01)
*G06F 9/34* (2006.01)

(52) U.S. Cl.
USPC ............ 711/216; 711/206; 711/103

(58) Field of Classification Search
CPC ........... G06F 12/0246; G06F 12/0238; G06F 2212/7202; G06F 12/1018
USPC ....................................................... 711/103
See application file for complete search history.

(56) References Cited

U.S. PATENT DOCUMENTS

| 4,430,701 | A | 2/1984 | Christian et al. |
| 4,463,375 | A | 7/1984 | Macovski |
| 4,584,686 | A | 4/1986 | Fritze |
| 4,589,084 | A | 5/1986 | Fling et al. |
| 4,777,589 | A | 10/1988 | Boettner et al. |
| 4,866,716 | A | 9/1989 | Weng |
| 5,003,597 | A | 3/1991 | Merkle |
| 5,077,737 | A | 12/1991 | Leger et al. |
| 5,297,153 | A | 3/1994 | Baggen et al. |
| 5,305,276 | A | 4/1994 | Uenoyama |
| 5,592,641 | A | 1/1997 | Doyle et al. |
| 5,623,620 | A | 4/1997 | Alexis et al. |
| 5,640,529 | A | 6/1997 | Hasbun |
| 5,657,332 | A | 8/1997 | Auclair et al. |
| 5,663,901 | A | 9/1997 | Harari et al. |
| 5,724,538 | A | 3/1998 | Morris et al. |
| 5,729,490 | A | 3/1998 | Calligaro et al. |
| 5,740,395 | A | 4/1998 | Wells et al. |
| 5,745,418 | A | 4/1998 | Hu et al. |
| 5,778,430 | A | 7/1998 | Ish et al. |
| 5,793,774 | A | 8/1998 | Usui et al. |
| 5,920,578 | A | 7/1999 | Zook et al. |
| 5,926,409 | A | 7/1999 | Engh et al. |
| 5,933,368 | A | 8/1999 | Hu et al. |
| 5,956,268 | A | 9/1999 | Lee |
| 5,956,473 | A | 9/1999 | Hu et al. |
| 5,968,198 | A | 10/1999 | Balachandran et al. |
| 5,982,659 | A | 11/1999 | Irrinki et al. |
| 6,011,741 | A | 1/2000 | Harari et al. |
| 6,016,275 | A | 1/2000 | Han |
| 6,038,634 | A | 3/2000 | Ji et al. |
| 6,081,878 | A | 6/2000 | Estakhri et al. |
| 6,094,465 | A | 7/2000 | Stein et al. |
| 6,119,245 | A | 9/2000 | Hiratsuka |
| 6,182,261 | B1 | 1/2001 | Haller et al. |
| 6,192,497 | B1 | 2/2001 | Yang et al. |
| 6,195,287 | B1 | 2/2001 | Hirano |

(Continued)

*Primary Examiner* — April Y Blair
*Assistant Examiner* — Daniel A Dersarkissian
(74) *Attorney, Agent, or Firm* — Dentons US LLP

(57) ABSTRACT

A flash memory controller, a computer readable medium and a method for writing to a flash memory device, the method may include receiving multiple logical pages, each logical page having a logical address; determining to write a logical page into a selected physical page of the flash memory device; calculating a hash value for each logical page of the multiple logical pages in response to (a) a logical address of the logical page and (b) a physical page index, to provide multiple hash values of the multiple logical pages.

29 Claims, 14 Drawing Sheets

(56) References Cited

U.S. PATENT DOCUMENTS

| | | |
|---|---|---|
| 6,199,188 B1 | 3/2001 | Shen et al. |
| 6,209,114 B1 | 3/2001 | Wolf et al. |
| 6,259,627 B1 | 7/2001 | Wong |
| 6,272,052 B1 | 8/2001 | Miyauchi |
| 6,278,633 B1 | 8/2001 | Wong et al. |
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,675,281 B1 | 1/2004 | Oh et al. |
| 6,704,902 B1 | 3/2004 | Shinbashi et al. |
| 6,751,766 B2 | 6/2004 | Guterman et al. |
| 6,772,274 B1 * | 8/2004 | Estakhri .................. 711/103 |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,968,421 B2 | 11/2005 | Conley |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,188,228 B1 | 3/2007 | Chang et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,212,426 B2 | 5/2007 | Park et al |
| 7,290,203 B2 | 10/2007 | Emma et al. |
| 7,292,365 B2 | 11/2007 | Knox |
| 7,301,928 B2 | 11/2007 | Nakabayashi et al. |
| 7,315,916 B2 | 1/2008 | Bennett et al. |
| 7,388,781 B2 | 6/2008 | Litsyn et al. |
| 7,395,404 B2 | 7/2008 | Gorobets et al. |
| 7,441,067 B2 | 10/2008 | Gorobets et al. |
| 7,443,729 B2 | 10/2008 | Li et al. |
| 7,450,425 B2 | 11/2008 | Aritome |
| 7,454,670 B2 | 11/2008 | Kim et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,610,433 B2 | 10/2009 | Randell et al. |
| 7,613,043 B2 | 11/2009 | Cornwell et al. |
| 7,619,922 B2 | 11/2009 | Li et al. |
| 7,697,326 B2 | 4/2010 | Sommer et al. |
| 7,706,182 B2 | 4/2010 | Shalvi et al. |
| 7,716,538 B2 | 5/2010 | Gonzalez et al. |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,911,848 B2 | 3/2011 | Eun et al. |
| 7,961,797 B1 | 6/2011 | Yang et al. |
| 7,975,192 B2 | 7/2011 | Sommer et al. |
| 8,020,073 B2 | 9/2011 | Emma et al. |
| 8,108,590 B2 | 1/2012 | Chow et al. |
| 8,122,328 B2 | 2/2012 | Liu et al. |
| 8,159,881 B2 | 4/2012 | Yang |
| 8,190,961 B1 | 5/2012 | Yang et al. |
| 8,250,324 B2 | 8/2012 | Haas et al. |
| 8,300,823 B2 | 10/2012 | Bojinov et al. |
| 8,305,812 B2 | 11/2012 | Levy et al. |
| 8,327,246 B2 | 12/2012 | Weingarten et al. |
| 8,407,560 B2 | 3/2013 | Ordentlich et al. |
| 8,417,893 B2 | 4/2013 | Khmelnitsky et al. |
| 2001/0034815 A1 | 10/2001 | Dugan et al. |
| 2002/0063774 A1 | 5/2002 | Hillis et al. |
| 2002/0085419 A1 | 7/2002 | Kwon et al. |
| 2002/0154769 A1 | 10/2002 | Petersen et al. |
| 2002/0156988 A1 | 10/2002 | Toyama et al. |
| 2002/0174156 A1 | 11/2002 | Birru et al. |
| 2003/0014582 A1 | 1/2003 | Nakanishi |
| 2003/0065876 A1 | 4/2003 | Lasser |
| 2003/0101404 A1 | 5/2003 | Zhao et al. |
| 2003/0105620 A1 | 6/2003 | Bowen |
| 2003/0177300 A1 | 9/2003 | Lee et al. |
| 2003/0192007 A1 | 10/2003 | Miller et al. |
| 2004/0015771 A1 | 1/2004 | Lasser et al. |
| 2004/0030971 A1 | 2/2004 | Tanaka et al. |
| 2004/0059768 A1 | 3/2004 | Denk et al. |
| 2004/0080985 A1 | 4/2004 | Chang et al. |
| 2004/0153722 A1 | 8/2004 | Lee |
| 2004/0153817 A1 | 8/2004 | Norman et al. |
| 2004/0181735 A1 | 9/2004 | Xin |
| 2004/0203591 A1 | 10/2004 | Lee |
| 2004/0210706 A1 | 10/2004 | In et al. |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144368 A1 | 6/2005 | Chung et al. |
| 2005/0169057 A1 | 8/2005 | Shibata et al. |
| 2005/0172179 A1 | 8/2005 | Brandenberger et al. |
| 2005/0213393 A1 | 9/2005 | Lasser |
| 2005/0243626 A1 | 11/2005 | Ronen |
| 2006/0059406 A1 | 3/2006 | Micheloni et al. |
| 2006/0059409 A1 | 3/2006 | Lee |
| 2006/0064537 A1 | 3/2006 | Oshima et al. |
| 2006/0101193 A1 | 5/2006 | Murin |
| 2006/0195651 A1 | 8/2006 | Estakhri et al. |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0282411 A1 | 12/2006 | Fagin et al. |
| 2006/0284244 A1 | 12/2006 | Forbes et al. |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0081388 A1 | 4/2007 | Joo |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0140006 A1 | 6/2007 | Chen et al. |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2007/0297226 A1 | 12/2007 | Mokhlesi |

(56) References Cited

U.S. PATENT DOCUMENTS

| | | |
|---|---|---|
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0112238 A1 | 5/2008 | Kim et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov et al. |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0027961 A1 | 1/2009 | Park et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0106486 A1* | 4/2009 | Kim et al. ..................... 711/103 |
| 2009/0113275 A1 | 4/2009 | Chen et al. |
| 2009/0125671 A1 | 5/2009 | Flynn et al. |
| 2009/0132755 A1 | 5/2009 | Radke |
| 2009/0144598 A1 | 6/2009 | Yoon et al. |
| 2009/0144600 A1 | 6/2009 | Perlmutter et al. |
| 2009/0150599 A1 | 6/2009 | Bennett |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi et al. |
| 2009/0287930 A1 | 11/2009 | Nagaraja |
| 2009/0300269 A1 | 12/2009 | Radke et al. |
| 2009/0323942 A1 | 12/2009 | Sharon et al. |
| 2010/0005270 A1 | 1/2010 | Jiang |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0172179 A1 | 7/2010 | Gorobets et al. |
| 2010/0174853 A1 | 7/2010 | Lee et al. |
| 2010/0180073 A1 | 7/2010 | Weingarten et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto et al. |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette et al. |
| 2010/0293321 A1 | 11/2010 | Weingarten |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0194353 A1 | 8/2011 | Hwang et al. |
| 2011/0209028 A1 | 8/2011 | Post et al. |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0017136 A1 | 1/2012 | Ordentlich et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |
| 2012/0117354 A1* | 5/2012 | Tatsumura et al. ........... 711/200 |
| 2012/0124273 A1 | 5/2012 | Goss et al. |
| 2012/0246391 A1 | 9/2012 | Meir et al. |
| 2012/0278569 A1* | 11/2012 | Kawakami et al. ........... 711/162 |

* cited by examiner

PRIOR ART

METHODS, SYSTEMS AND COMPUTER READABLE MEDIUM FOR WRITING AND READING DATA

BACKGROUND OF THE INVENTION

Flash memory devices store information with high density on flash memory cells with ever smaller dimensions. In addition, Multi-Level Cells (MLC) may store several bits per cell (bpc) by setting the amount of charge in a cell. Flash memory devices are organized into (physical) pages. Each physical page includes a section allocated for data (e.g., 512 bytes-16 KB and expected larger in the future) and a small amount of spare bytes (e.g., 64-1024 or more bytes for every page) for storing redundancy and metadata. The redundancy bytes are used to store error correcting information, for correcting errors which may have occurred during flash lifetime and the page read process. Each program (write) operation is performed on an entire page. A number of pages are grouped together to form an erase block (also referred to as block). A page cannot be erased unless the entire erase block which includes that page is erased.

One common application of flash memory devices is Secure Digital (SD) cards. Another common application of flash memory devices is Solid State Disks (SSDs). An SSD may typically include a flash memory device and a flash memory controller. The flash memory controller translates commands coming in through the SSD interface into actions (Read/Write/Erase) on the flash memory device. The most common SSD commands may be read commands and write commands of one or more sectors, where a sector may be, but is not limited to, a sequence of 512 bytes.

The read commands or write commands may be of a single sector or multiple sectors. These commands may refer to logical addresses. These addresses may then be redirected to new addresses on the flash memory device which need not directly correspond to the logical addresses that might be referenced by the read or write commands.

This is due to memory management that may be carried out by the flash memory controller in order to support several features such as wear-leveling, bad block management, firmware code and data, error-correction, and others. The erase function is performed on an entire erase block. Because of this functionality, before the data of a selected block may be replaced such as during a write function, the new data must be written in an alternative location before an erase can occur, to preserve the integrity of the stored data.

In some SSDs, the flash memory controller may typically have only a small random access memory (RAM) available for storage. The small size of the RAM limits the type of memory management which may be carried out by the flash memory controller with regard to the data stored in the flash memory device and received from the interface.

The flash memory controller of an SSD may typically manage the flash memory device at the page level. In this approach, each logical page address is associated with an arbitrary physical page address, and the flash memory controller must maintain this association (mapping). In this method, part of the physical space is mapped to logical data, and the rest is set aside for management purposes and is typically named over provisioning. At each time, one or more blocks may be open for writing. When a logical page is to be written, the flash memory controller writes its content into the next available physical page in an open block and updates the physical association of this logical page to the new location. The previous physical location which held the data of this logical address prior to the write is typically designated as obsolete or superseded. The remaining physical pages in a block which are not superseded are called valid physical pages. Once all of the physical pages of an open block are written, a fresh block from the over provisioning is taken, and future writes resume to this block.

Once no more free blocks from the over provisioning are available to host new pages, or the number of free blocks is reduced below some threshold, the flash memory controller begins a process in which valid physical pages from a first block with superseded physical pages are copied into a second empty block, and once no more valid physical pages are left in the first block, the first block is added to the list of free blocks. This process is typically called cleaning.

A logical page designated by a logical page address is read by first looking up its physical address and then reading the data from the physical address which is associated to this logical page.

The flash memory controller may implement a logical to physical (L2P) mapping between a logical page address and a physical page address by means of a L2P table.

The L2P table may be a list of entries that hold, for each logical page which is mapped in the user space, a corresponding physical address.

An example of a prior art L2P table 10 is depicted in FIG. 1. The L2P table 10 includes M entries 10(0)-10(M-1), each entry stores the address of a physical page (physical address) and each entry is pointed by a logical address of a page out of logical pages 0 till (M-1) 20(0)-20(M-1).

FIG. 1 illustrates that the physical pages that are pointed by sequential logical addresses are non-sequential. Thus, L2P table includes the following sequence of physical addresses—physical page 17, physical page 1009, physical page 7289 till physical page 2284.

FIG. 2 illustrates the j'th entry (10, j) of the prior art L2P table 10 of FIG. 1. The j'th entry (10, j) can include a block address 10(j, 1) that is N1 bits long and a page address 10(j, 2) that is N2 bits long. The block address designates the block address and the page address determines the page address within that block.

The number (M) of entries in the L2P table is the number of user-mapped pages, while the size of each entry is the number of bits required to represent the address of each of the physical pages in the disk.

For example, for an SSD with physical size C of 256 GB ($2^{30}$ bytes), logical user space U of 256 GB ($10^9$ bytes), and page size P of 4 KB, the minimal size in bytes required for the complete L2P table is given by:

$$S_{L2P} = \frac{U}{P} * \left[\log_2\left(\frac{C}{P}\right)\right] \Big/ 8$$

$$= \frac{256 * 10 \wedge 9}{4 * 2 \wedge 10} * \left[\log_2\left(\frac{256 * 2 \wedge 30}{4 * 2 \wedge 10}\right)\right] \Big/ 8 = 193.7 * 2 \wedge 20 \text{ [Bytes]}$$

If pages of size 4 KB are used in an SSD of 256 GB, where 4 bytes are used to hold the physical address of each logical page, then, a L2P table of size 256 MB would be required.

Such large memory requirements may often be accommodated by means of external volatile memory (e.g., DRAM). This requirement introduces additional costs to the complete system. Storing the L2P tables more efficiently can potentially cut down some of these costs.

There is a growing need to reduce the size of the L2P table.

SUMMARY OF THE INVENTION

According to an embodiment of the invention a method for writing to a flash memory device may be provided and may include receiving multiple logical pages, each logical page having a logical address; determining to write a logical page into a selected physical page of the flash memory device, the selected physical page has a selected physical page address that is represented by a physical page index, a set index and a block index; the physical page index being indicative of an order of the selected physical page within a selected set of physical pages, the selected set of physical pages is being identified by the set index, the block index is indicative of a block of the flash memory device that comprises the selected set of physical pages; calculating a hash value for each logical page of the multiple logical pages in response to (a) a logical address of the logical page and (b) the physical page index, to provide multiple hash values of the multiple logical pages; searching for a matching logical page that is associated with a hash value that matches the set index; writing the matching logical page to the selected physical page and updating a first data structure to be indicative of a mapping between a logical address of the matching logical page and the selected physical address; and writing a mismatch logical page to the selected physical page, updating the first data structure and the second data structure to be indicative of a mapping between a logical address of the mismatch logical page and the selected physical address—if neither one of the multiple logical pages is associated with a hash value that matches the set index.

The updating of the first data structure and the second data structure may include writing the physical page index of the selected physical page to the first data structure and writing the set index to the second data structure.

The method may include selecting a matching logical page out of a plurality of matching logical pages.

The method may include selecting the matching logical page in response to an age of each of the plurality of matching logical pages.

The method may include electing the mismatch logical page based upon a distribution of hash values of the multiple logical pages.

The method may include selecting the mismatch logical page out of a largest group of logical pages that share a same hash value.

The selected set of physical pages may include a consecutive sequence of physical pages.

The selected set of physical pages may include non-consecutive physical pages that are located at a same relative position in sub-blocks of the selected block.

The method may include storing the multiple logical pages in a buffer before writing to the selected physical page.

The multiple logical pages may fill the buffer.

The multiple logical pages may partially fill the buffer.

The method may include receiving a request to read a requested logical page from the flash memory device, the requested logical page has a requested logical address; searching the second data structure for a logical address of a mismatch logical page that equals the requested logical address; retrieving the requested logical page based upon the first and second data structures if it is determined that the second data structure may include a logical address of a mismatch logical page that equals the requested logical address; and retrieving the requested logical page based upon the first data structures and not upon the second data structure if it is determined that the second data structure does not comprise a logical address of a mismatch logical page that equals the requested logical address.

The method may include calculating a physical address of a physical page that stores the requested logical page based upon (a) the requested logical address, (b) a set index that is stored in the second data structure and is associated with the requested logical address, and (c) a physical page index stored in the first data structure and is associated with the requested logical page address, if it is determined that the second data structure may include the logical address of the mismatch logical page that equals the requested logical address.

The method may include calculating a physical address of a physical page that stores the requested logical page based upon (a) the requested logical address, and (b) a physical page index stored in the first data structure and is associated with the requested logical address, if it is determined that the second data structure does not comprise a logical address of a mismatch logical page that equals the requested logical address.

Further embodiments of the invention include a computer readable medium that is non-transitory and may store instructions for performing the above-described methods and any steps thereof, including any combinations of same. For example, the computer readable medium may store instructions for receiving multiple logical pages, each logical page having a logical address; determining to write a logical page into a selected physical page of the flash memory device, the selected physical page has a selected physical page address that is represented by a physical page index, a set index and a block index; the physical page index being indicative of an order of the selected physical page within a selected set of physical pages, the selected set of physical pages is being identified by the set index, the block index is indicative of a block of the flash memory device that comprises the selected set of physical pages; calculating a hash value for each logical page of the multiple logical pages in response to (a) a logical address of the logical page and (b) the physical page index, to provide multiple hash values of the multiple logical pages; searching for a matching logical page that is associated with a hash value that matches the set index; writing the matching logical page to the selected physical page and updating a first data structure to be indicative of a mapping between a logical address of the matching logical page and the selected physical address; and writing a mismatch logical page to the selected physical page, updating the first data structure and the second data structure to be indicative of a mapping between a logical address of the mismatch logical page and the selected physical address—if neither one of the multiple logical pages is associated with a hash value that matches the set index.

The updating of the first data structure and the second data structure may include writing the physical page index of the selected physical page to the first data structure and writing the set index to the second data structure.

The computer readable program may store instructions for selecting a matching logical page out of a plurality of matching logical pages.

The computer readable program may store instructions for selecting the matching logical page in response to an age of each of the plurality of matching logical pages.

The computer readable program may store instructions for electing the mismatch logical page based upon a distribution of hash values of the multiple logical pages.

The computer readable program may store instructions for selecting the mismatch logical page out of a largest group of logical pages that share a same hash value.

The selected set of physical pages may include a consecutive sequence of physical pages.

The selected set of physical pages may include non-consecutive physical pages that are located at a same relative position in sub-blocks of the selected block.

The computer readable program may store instructions for storing the multiple logical pages in a buffer before writing to the selected physical page.

The multiple logical pages may fill the buffer.

The multiple logical pages may partially fill the buffer.

The computer readable program may store instructions for receiving a request to read a requested logical page from the flash memory device, the requested logical page has a requested logical address; searching the second data structure for a logical address of a mismatch logical page that equals the requested logical address; retrieving the requested logical page based upon the first and second data structures if it is determined that the second data structure may include a logical address of a mismatch logical page that equals the requested logical address; and retrieving the requested logical page based upon the first data structures and not upon the second data structure if it is determined that the second data structure does not comprise a logical address of a mismatch logical page that equals the requested logical address.

The computer readable program may store instructions for calculating a physical address of a physical page that stores the requested logical page based upon (a) the requested logical address, (b) a set index that is stored in the second data structure and is associated with the requested logical address, and (c) a physical page index stored in the first data structure and is associated with the requested logical page address, if it is determined that the second data structure may include the logical address of the mismatch logical page that equals the requested logical address.

The computer readable program may store instructions for calculating a physical address of a physical page that stores the requested logical page based upon (a) the requested logical address, and (b) a physical page index stored in the first data structure and is associated with the requested logical address, if it is determined that the second data structure does not comprise a logical address of a mismatch logical page that equals the requested logical address.

Additional embodiments of the invention include a system arranged to execute any or all of the methods described above, including any stages-and any combinations of same. For example, the system may include (i) a flash memory controller that may include a buffer arranged to receive and store multiple logical pages, each logical page having a logical address; a write circuit arranged to determine to write a logical page into a selected physical page of a flash memory device that is coupled to the flash memory controller, the selected physical page has a selected physical page address that is represented by a physical page index, a set index and a block index; the physical page index being indicative of an order of the selected physical page within a selected set of physical pages, the selected set of physical pages is being identified by the set index, the block index is indicative of a block of the flash memory device that comprises the selected set of physical pages; a hash circuit arranged to calculate a hash value for each logical page of the multiple logical pages in response to (a) a logical address of the logical page and (b) the physical page index, to provide multiple hash values of the multiple logical pages; a search circuit arranged to search for a matching logical page that is associated with a hash value that matches the set index; wherein the write circuit is arranged to write the matching logical page to the selected physical page and updating a first data structure to be indicative of a mapping between a logical address of the matching logical page and the selected physical address; and write a mismatch logical page to the selected physical page, updating the first data structure and the second data structure to be indicative of a mapping between a logical address of the mismatch logical page and the selected physical address—if neither one of the multiple logical pages is associated with a hash value that matches the set index.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
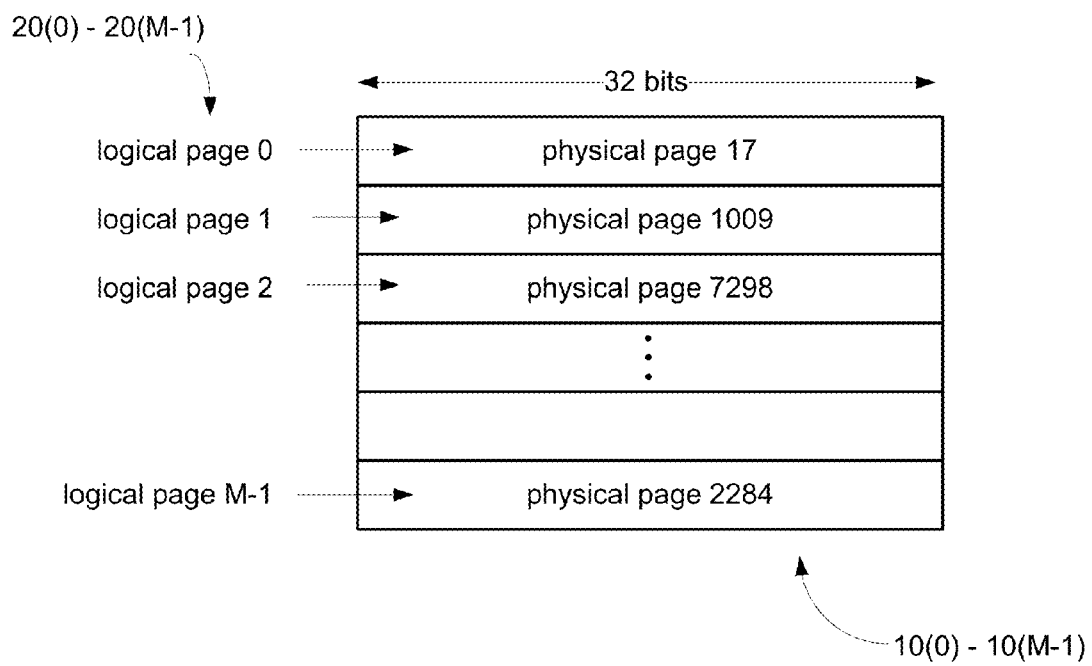
FIG. 1 illustrates a prior art logical to physical (L2P) table.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The symbol "^" means power. Thus a^b means a by the power of b.

The following terms may be construed either in accordance with any definition thereof appearing in the prior art literature or in accordance with the specification, or as follows:

Flash memory cell: a component of flash memory device that stores one bit of information (in single-level cell devices) or n bits of information (in a multi-level device having $2^n$ levels). Typically, each cell includes a floating-gate transistor. "Multi-level" means that the physical levels in the cell are, to an acceptable level of certainty, statistically partitionable into multiple distinguishable regions, plus a region corresponding to zero, such that digital values each comprising multiple bits can be represented by the cell. In contrast, in single-level cells, the physical levels in the cell are assumed to be statistically partitionable into only two regions, one corresponding to zero and one other, non-zero region, such that only one bit can be represented by a single-level cell.

Flash memory device: a non-volatile computer memory including cells that are erased block by block, each block typically comprising more than one page, but are written into and read from, page by page. Includes NOR-type flash memory, NAND-type flash memory, and PRAM, e.g. Samsung PRAM, inter alia, and flash memory devices with any suitable number of levels per cell, such as but not limited to 2, 4, or 8.

Logical page: a portion of typically sequential data, whose amount is typically less than or equal to a predetermined amount of data defined to be a page full of data, which has typically been defined by a host (data source/destination) or user thereof, as a page, and which is sent by the host to a flash memory device for storage and is subsequently read by the host from the flash memory device.

Physical Page: a portion, typically 512 or 2048 or 4096 bytes in size, of a flash memory device e.g. a NAND or NOR flash memory device. Writing and reading is typically performed physical page by physical page, as opposed to erasing which can be performed only at a granularity of an erase sector. A few bytes, typically 16-32 for every 512 data bytes are associated with each page (typically 16, 64 or 128 per page), for storage of error correction information. A typical block may include 32 512-byte pages or 64 2048-byte pages or 256 8 Kbyte pages.

Alternatively, a physical page is an ordered set (e.g. sequence or array) of flash memory cells which are all written in simultaneously by each write operation, the set typically comprising a predetermined number of typically physically adjacent flash memory cells containing actual data written by and subsequently read by the host, as well as, typical error correction information and back pointers used for recognizing the true address of a page.

Embodiments of the present invention seek to reduce the memory size required for a logical to physical translation (L2P) table, hence reducing the cost associated with a Flash memory system.

Certain embodiments of the present invention reduce the size of the L2P table by reducing the size of each L2P entry.

Figure 2A:
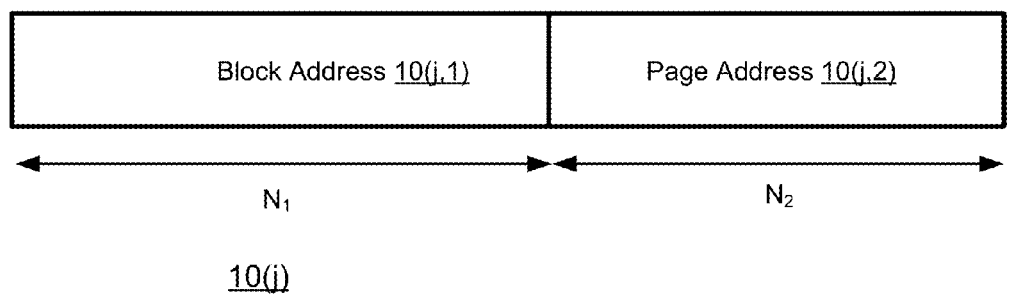
FIG. 2A illustrates a prior art entry of the L2P table of FIG. 1.
Figure 2B:
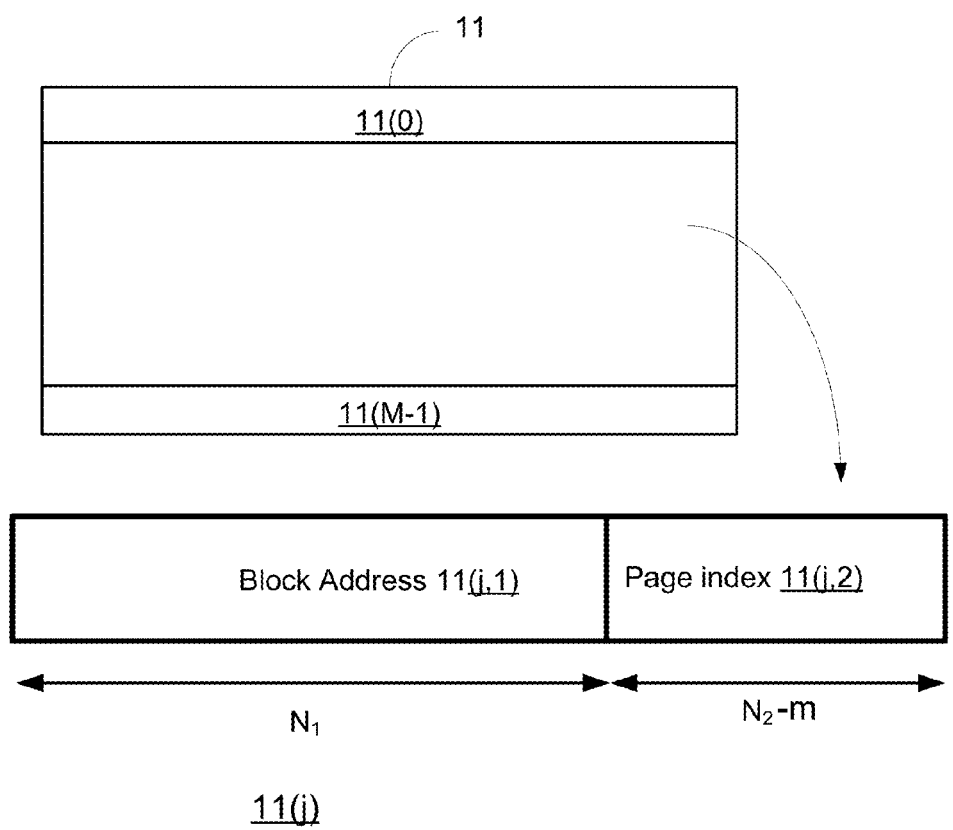
FIG. 2B illustrates an entry of a L2P table according to an embodiment of the invention.

FIG. 2B shows an example of a L2P table 11 and an L2P entry 11(j) according to an embodiment of the invention.

L2P table 11 has M entries such as 11(0)-11(M−1), each is (N1+N2−m) bits long. The j'th entry is divided into two parts, one of which (of size $N_1$ bits) designates the block address 11(j,1) and another (of size $[N_2-m]$ bits) and denoted 11(j,2) designates a page index that is further processed (with the logical address) to provide a set of physical pages. Each set of physical pages can have a unique set index value.

The block index, set index and the page index determine the physical address of physical page that stores the logical page that has a logical address that is used to access the j'th entry 11(j). The SSD may have one or more blocks which are open for writing at each instant. These blocks may be written in order, starting from the first physical page in the block and ending at the last physical page in the block. When a new physical page is to be written to the SSD, the flash memory controller decides to which of the open blocks the logical page is written, and updates the L2P table with the bits corresponding to the block index and the page index.

According to certain embodiments of the present invention, the number of bits which is used to designate the page address within the block may be reduced by m bits. Reducing the number of bits in this way may result in two logical pages having an identical L2P entry. However, since every logical page should be uniquely mapped to a physical page, it follows that the logical page address is also used to determine the exact physical page. In other words, each logical address is linked a-priori to some set of possible physical addresses. At each instant, an incoming write transaction may either be linked to the next available physical page or not.

In certain embodiments of the present invention, the logical page addresses of the write transactions are randomly spread over some part or of the user space or its entirety. Therefore, it may occur that the logical address of an incoming logical page is not linked to the currently selected set of physical pages (the set of physical pages that is being written to). Certain embodiments of the invention may store the incoming logical page in a buffer until the currently selected set of physical pages matches the incoming logical page. The SSD may continue to store incoming logical pages until receiving a logical page that is associated with the currently selected set of physical pages. Once a logical page arrives which matches the currently selected set of physical pages, the logical page is written to a current physical page of the currently selected set of physical pages. If the currently selected set of physical pages changes after this write operation, the flash memory controller searches the buffer for logical pages which match the new currently selected set of pages.

In certain embodiments of the present invention, the L2P entry size may be reduced by removing some or all of the bits used to designate the block address.

In certain embodiments of the present invention, the block is divided into sets of physical pages, and the bits in the L2P entry which typically are used to hold the page index within the block may store only the index (page index) of the physical page within the set of physical pages. A set index may be determined by some hashing function that is applied on (i) the logical address and (ii) the page index. The set index is used to index one of $2^m$ sets of physical pages. The page index is used to index the pages belonging to some set of physical pages.

According to some embodiments of the invention, let $N_p=2^{N_2}$ be the number of pages in a block, and let m be the number of bits which are removed from the entry of the L2P entry.

The physical pages in each block may be partitioned to ($2^m$) sets of physical pages of equal size $N_s=N_p/(2^m)$ pages. There are numerous ways to partition the block.

Figure 3A:
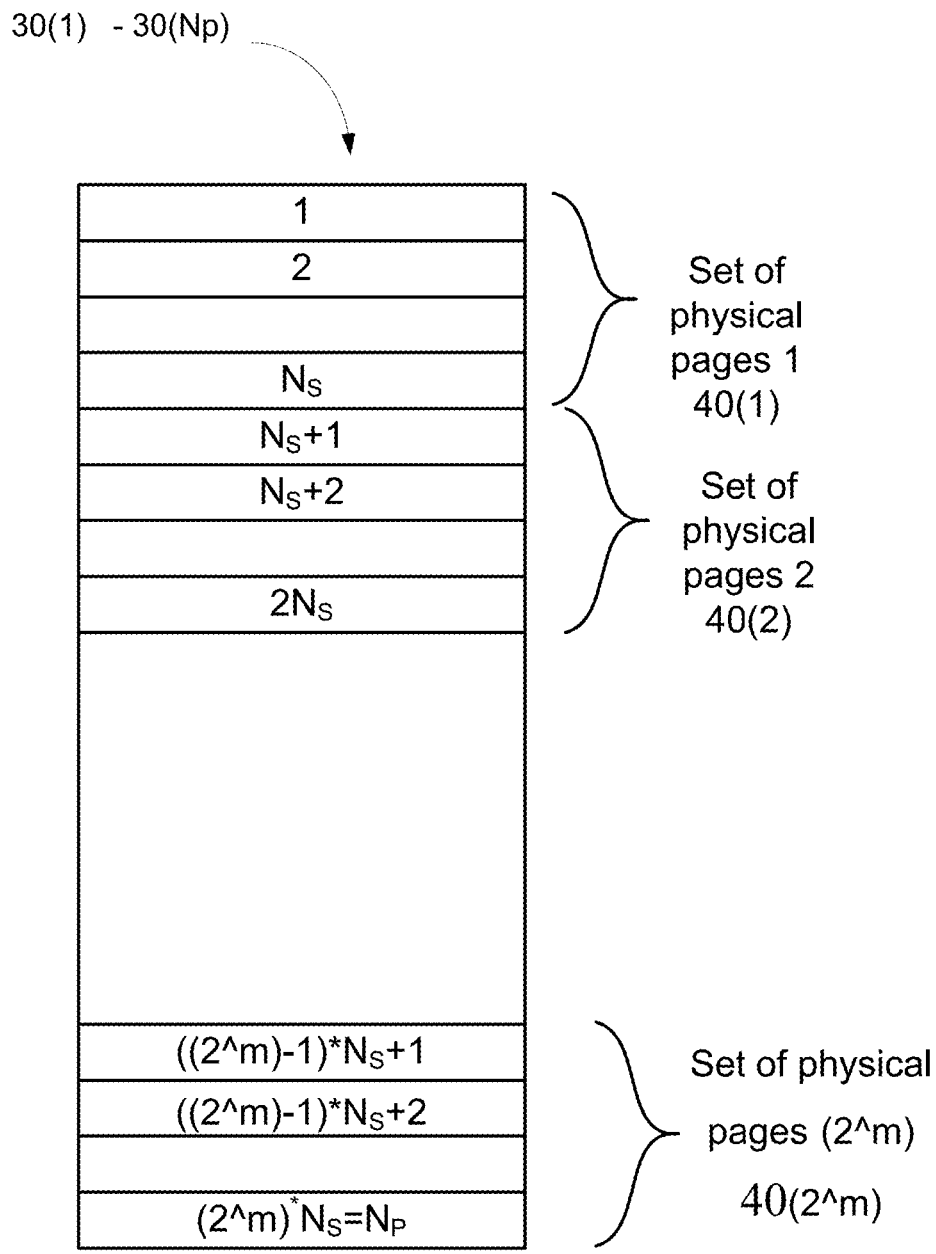
FIG. 3A illustrates a partition of a block of a flash memory device to multiple sets of physical pages according to an embodiment of the invention.

According to some embodiments of the invention, the block may be partitioned according to the scheme depicted in FIG. 3A. According to this scheme, the first set of physical pages 40(1) includes physical pages 1, 2, ..., N, $p_1$, $p_2$, ..., $pz_4$, the second set of physical pages 40(2) includes physical pages $N_s+1$, $N_s+2$, ..., $2*N_s$, and the last set of physical pages 40($2^m$) includes physical pages $(2^m-1)*N_s+1$, $(2^m-1)*N_s+2$, ..., $(2^m)*N_s$.

According to some embodiments of the invention, let $A_1$, $A_2$, ... be a sequence of logical addresses each associated with a 4 KB page write transaction, and let there be defined $N_s$ hashing function h(A, t), t=1, 2, ..., $N_s$, which maps each logical address to one of the elements in the set {1, 2, ..., ($2^m$)}.

According to some embodiments of the invention, the write flow proceeds as follows. At each time instant a selected physical page of a selected set of physical pages of a selected block may be open for writing. The selection can be made in a manner that sequentially scans each set of physical pages and sequentially scans each block.

The flash memory controller may write the logical pages to the selected block in the following order (see FIG. 3A). First, it may write to physical page 1 of set of physical pages 1, continue with writing to physical page 2 of set of physical pages 1, and so on, until writing to physical page $N_s$ of set of physical pages 1. After completing writing all the pages in set of physical pages 1, it may continue to write to physical page 1 of set of physical pages 2, write to physical page 2 of set of physical pages 2, and so on.

According to some embodiments of the invention, every time a request is made to write a logical page, the logical page enters a buffer of fixed length L. Once the buffer is full (or once a predetermined portion of the buffer is filled), the flash memory controller may begin writing logical pages from the buffer into the flash memory device. According to some embodiments, the flash memory controller may write logical pages to the selected block in order, starting with the first physical page of the selected block, and ending at the last physical page of the selected block.

According to some embodiments, prior to every such write, the flash memory controller may compute the hash values of the logical address corresponding to all (or a subset of all) logical pages which are stored in the buffer. For each such logical page, the flash memory controller may compute the hash value by computing the value of h(A, p), A being the logical address of the logical page and p being the page index of the selected physical page—indicative of the order of the selected physical page within the selected set of physical pages.

If multiple logical pages (multiple matching logical pages) are associated with a hash value that matches the set index of the selected set of physical pages (the selected set of physical pages includes a selected physical page that should be currently written) then the flash memory controller may select one of these matching logical pages to be written to the selected physical page. The matching logical page that is selected may be the oldest matching logical page in the buffer. If only a single matching logical page is found then it is written to the selected physical page.

The flash memory controller may then update the L2P entry of the selected logical page with the page index of the matching logical page (either the selected matching logical page or of the single matching logical page).

If no matching logical page is found in the buffer (that hash value associated with neither one of the logical pages stored in the buffer matches the set index of the selected set of physical pages) then a miss (or mismatch) is declared and the flash memory controller may elect a mismatch logical pages out of the logical pages stored in the buffer and write the mismatch logical page to the selected physical page.

The election can be based upon the distribution of the hash values. For example—the flash memory controller may elect a mismatch logical page out of a largest group of mismatch logical pages that share the same hash. The election (between members of the group) may be based upon the time of receiving the mismatch logical page (elect the oldest page of the group) or on any other parameter.

The flash memory controller may then update the L2P entry with the block index and the page index of the mismatch logical page and update a second data structure (such as a miss list) with the set index of the mismatch logical page (this set index represents a set of physical pages that differs from the selected set of physical pages that includes a selected physical page that should be currently written to) and association information that associates the mismatching page with the entry of the second data structure. The association information may be the logical address of the mismatch logical page.

Figure 4:
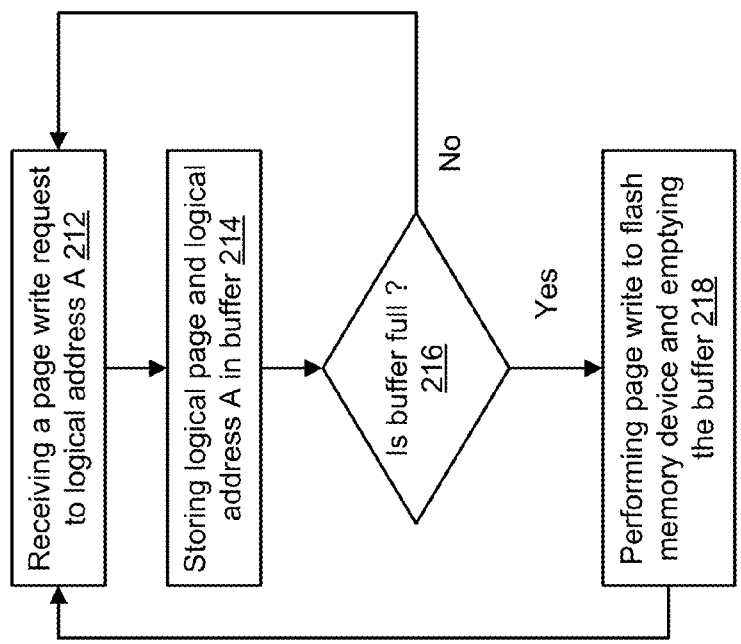
FIGS. 4-6 illustrate methods for writing to a flash memory device according to an embodiment of the invention.

FIG. 4 illustrates a method 210 for managing a buffer and writing to a flash memory device according to an embodiment of the invention.

Method 210 starts by stage 212 of receiving a page write request to logical address A.

Stage 212 may be followed by stage 214 of storing the logical page and logical address A in a buffer.

Stage 214 may be followed by stage 216 of checking if the buffer full—either completely full or full enough to trigger a writing operation to a selected physical memory page.

If the buffer is not full enough stage 216 is followed by stage 212—else it is followed by stage 218 of performing page write to flash memory device and emptying the buffer.

Figure 5:
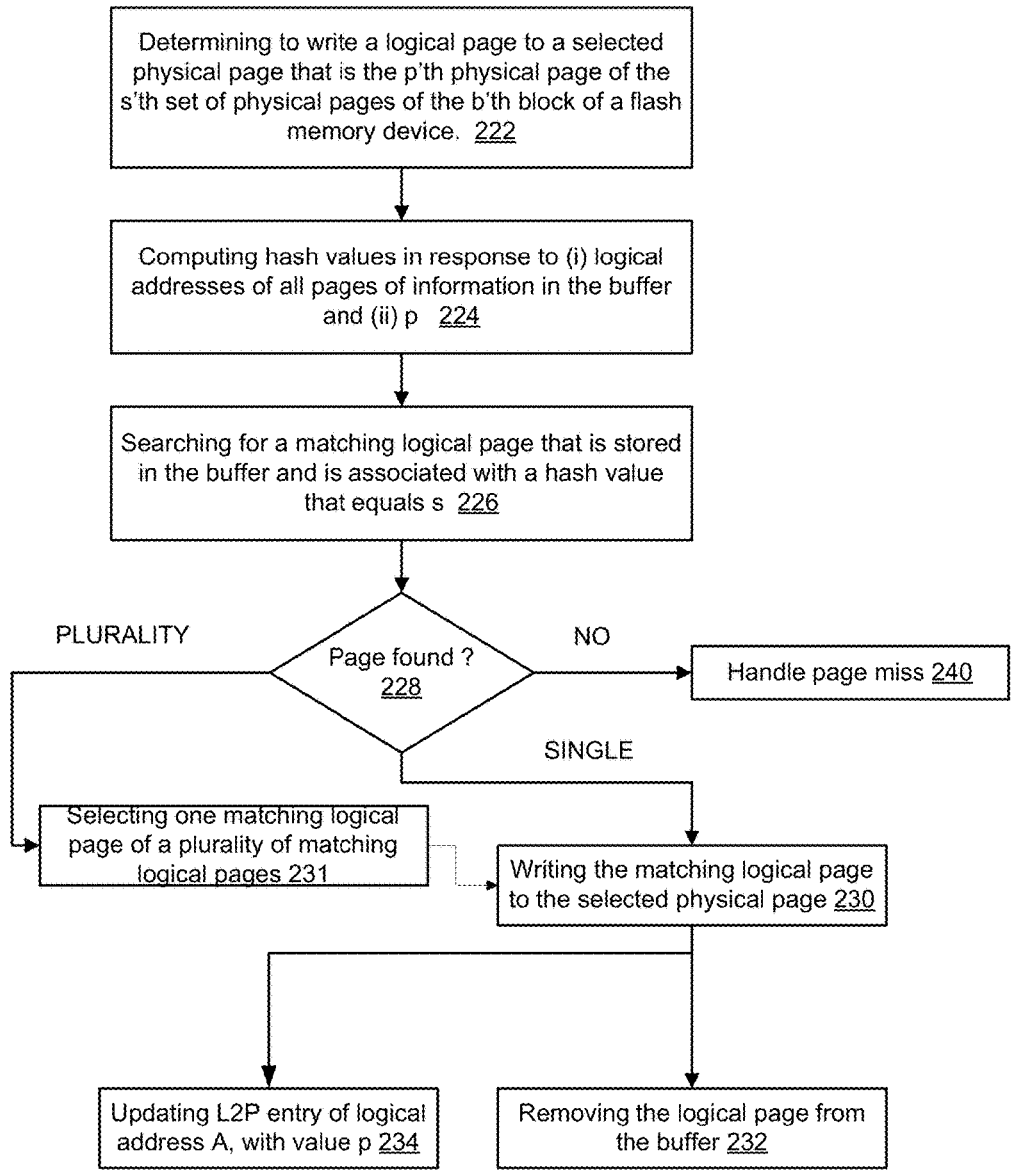

FIG. 5 illustrates a method 220 for writing to a selected physical page according to an embodiment of the invention.

Method 220 starts by a sequence of stages 222, 224 and 226.

Stage 222 may include determining to write a logical page to a selected physical page that is the p'th physical page of the s'th set of physical pages of the b'th block of a flash memory device.

Stage 224 may include computing hash values in response to (i) logical addresses of all pages of information in the buffer and (ii) p. Stage 226 may include searching for a matching logical page that is stored in the buffer and is associated with a hash value that equals s.

Stage 226 is followed by query stage 228 of determining whether one or more matching logical pages have been found during the searching of stage 226.

If no such matching logical page is found then stage 228 is followed by stage 240 of handling a page miss.

If a plurality of matching logical pages are found then stage 228 is followed by stage 231 of selecting one matching logical page of the plurality of matching logical pages and jumping to stage 230.

If a single matching logical page is found then stage 228 is followed by stage 230 of writing the matching logical page to the selected physical logical page.

Stage 230 is followed by stage 234 of updating L2P entry of logical address A, with value p and by stage 232 of removing the logical page from the buffer.

Figure 6:
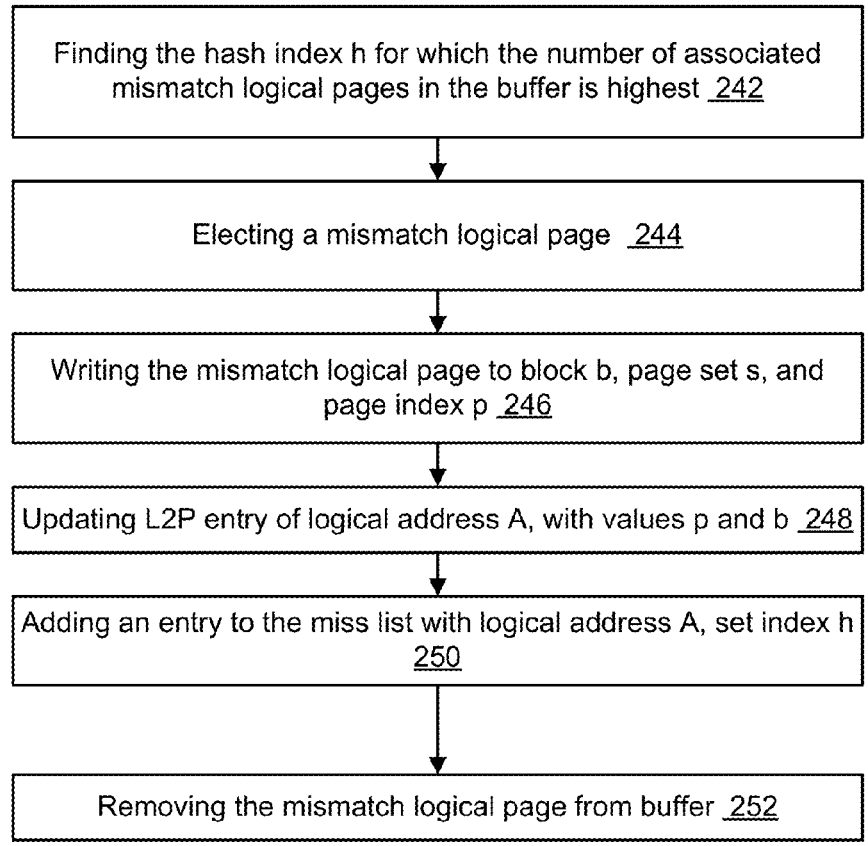

FIG. 6 illustrates a method 240 for managing a page miss according to an embodiment of the invention.

Method 240 may include a sequence of stages 242, 244, 246, 248, 250 and 252.

Stage 242 may include finding the hash index h for which the number of associated mismatch logical pages in the buffer is highest.

Stage 244 may include electing a mismatch logical page.

Stage 246 may include writing the mismatch logical page to block b, page set s, and page index p.

Stage 248 may include updating L2P entry of logical address A, with values p and b.

Stage 250 may include adding an entry to the miss list with logical address A, set index s.

Stage 252 may include removing the mismatch logical page from buffer.

Figure 7:
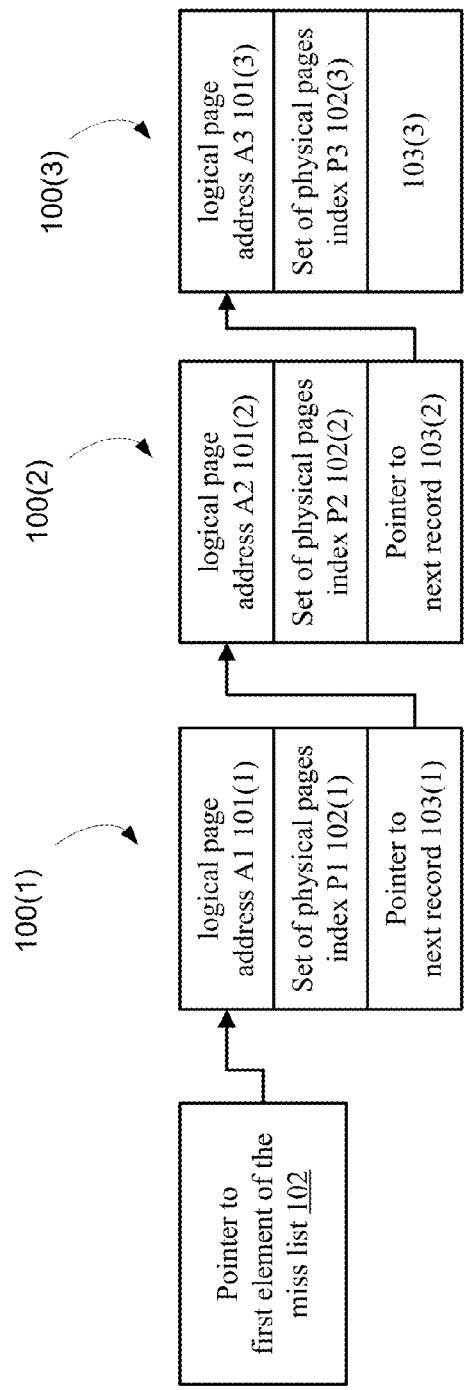
FIG. 7 illustrates a second data structure according to an embodiment of the invention.

FIG. 7 illustrates a second data structure such as linked list 100 according to an embodiment of the invention.

The second data structure can differ from a linked list. Using a linked list allows to support any number of miss events, without predefined and fixed memory allocation.

The linked list 100 of FIG. 7 has three list elements 100(1)-100(3) and a pointer to the first element of the linked list 102. The number of the list elements can differ from three—and match the number of mismatch logical pages.

Each list element may include (i) a logical address of a mismatch logical page (may be 4 bytes long or any other size), (ii) a set index of the selected set of physical pages to which the mismatch logical page was actually written (may be m bits long), and (iii) a pointer to the next list element (may be {32-m} bits long)—if such next list element exists.

Thus, list elements 100(1)-100(3) include logical address of mismatch logical pages 101(1)-101(3), set indexes of selected sets of physical pages to which the mismatch logical pages were written 102(1)-102(3), and pointers (only includes in list elements 100(1) and 100(2) to the next list element 103(1) and 103(2).

According to some embodiments, the second data structure can be a sorted list that is sorted according to the logical addresses.

According to some embodiments of the invention, when the flash memory controller performs cleaning of a block, it may remove from the page miss list entries belonging to mismatch logical pages of that block which are moved to new locations.

According to embodiments of the invention, the read flow may proceed as follows. Whenever a request is made to read a requested logical page having a requested logical address, the flash memory controller may search the second data structure (for example a page miss list) for an entry that stores a logical address that matches the requested logical address. If such an entry is found, the flash memory controller may continue to read the L2P entry associated with the logical page address, and obtain the page index. The flash memory controller may then calculate the physical address of the physical pages that stores the requested logical page in response to (a) the set index from the miss page list, (b) the page index from the L2P table, and (c) the requested logical address. The flash memory controller may then read the content of the physical page that resided at that physical address.

According to some embodiments, if no entry exists in the second data structure (such as the page miss list) which corresponds to the requested logical page address, the flash memory controller may read the L2P entry associated with the requested logical page address and obtain the page index.

The flash memory controller may then calculate the set index corresponding to the logical page address by passing the logical address and the page index through the hashing function. Finally, the flash memory controller may then calculate the physical address of the physical page that stores the requested logical page in response to (a) the set index calculated based upon the L2P entry, (b) the page index from the L2P table, and (c) the requested logical address. The flash memory controller may then read the content of the physical page that resided at that physical address.

Figure 8:
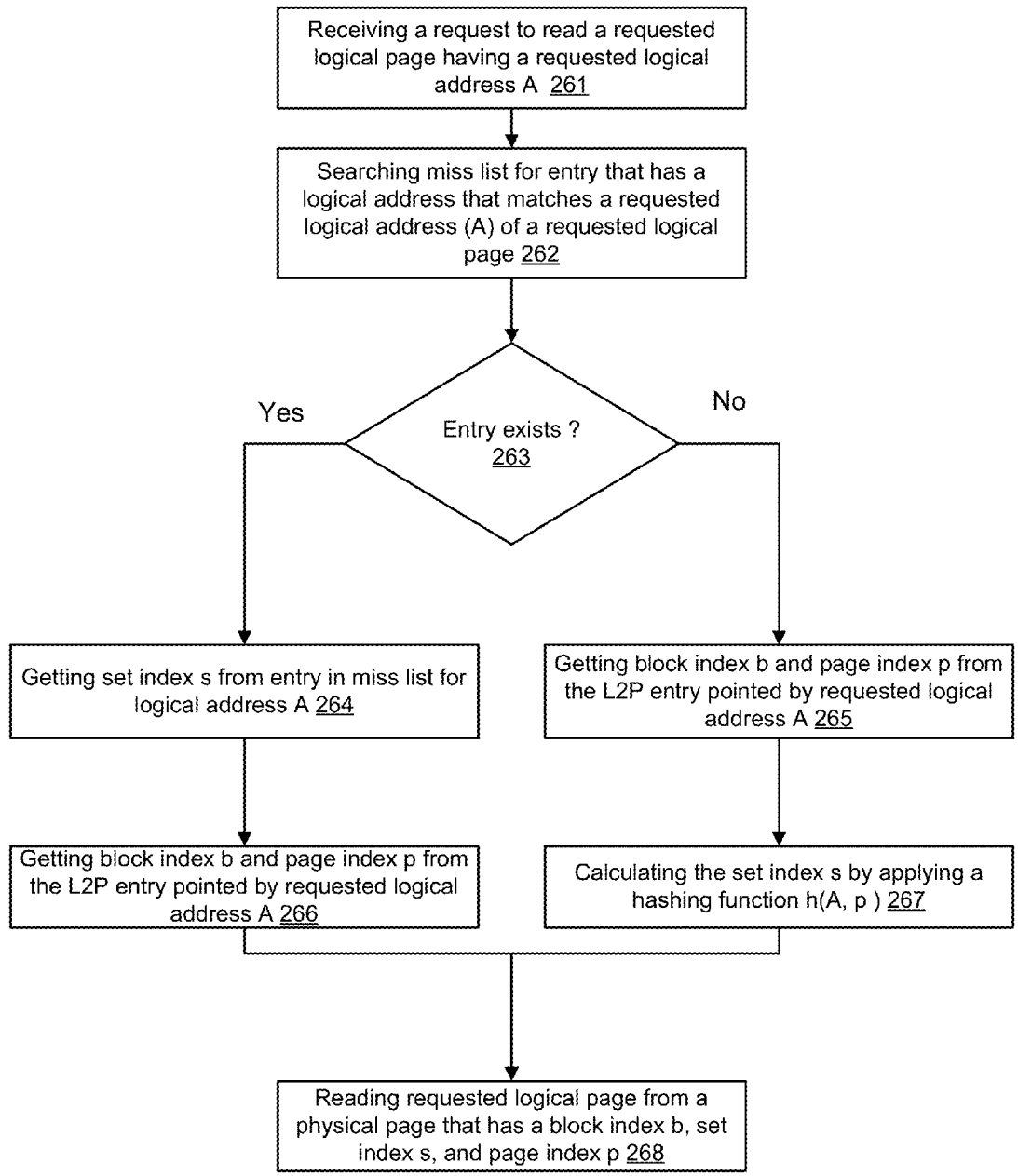
FIG. 8 illustrates a method for reading from a flash memory device according to an embodiment of the invention.

FIG. 8 illustrates a method 260 for reading a requested logical page having a requested logical address according to an embodiment of the invention.

Method 200 may start by stage 261 of receiving a request to read a requested logical page having a requested logical address A.

Stage 261 may be followed by stage 262 of searching miss list for entry that has a logical address that matches a requested logical address (A) of a requested logical page.

If it is determined that the miss list includes such an entry then stage 262 is followed by a sequence of stages 264 and 266. Else-it is followed by a sequence of stages 265 and 267. Stages 266 and 267 are followed by stage 268.

Stage 264 may include getting set index s from entry in miss list for logical address A.

Stage 266 may include getting block index b and page index p from the L2P entry pointed by requested logical address A.

Stage 265 may include getting block index b and page index p from the L2P entry pointed by requested logical address A.

Stage 267 may include calculating the set index s by applying a hashing function h(A, p).

Stage 268 may include reading requested logical page from a physical page that has a block index b, set index s, and page index p. According to an embodiment of the invention, the order of operations can be changed from this mentioned above. For example—the order can be reversed. The controller may first turn to the lookup table and see if the requested page has a valid address (pages in the miss list may be denoted by special value in the lookup table to signify that that they are found in the miss-list). If the address is not valid, it may then turn to look at the linked list.

According to some embodiments of the invention, the flash memory controller may partition the pages in the block according to the location of the physical pages within consecutive sub-blocks, each sub-block include a continuous sequence of physical pages and each set of physical pages includes different physical pages that are located at the same location at different sub-blocks.

Figure 3B:
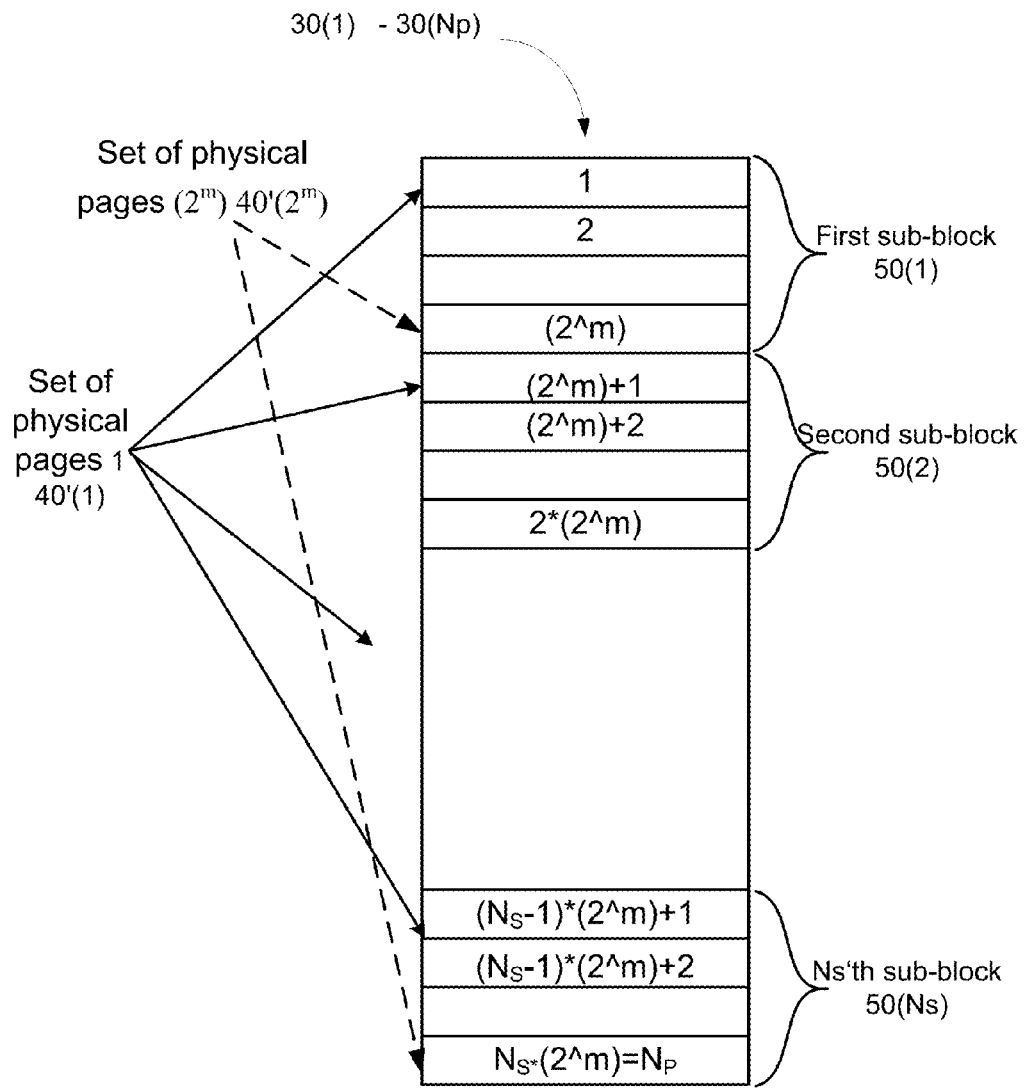
FIG. 3B illustrates a partition of a block a flash memory device to multiple sets of physical pages according to an embodiment of the invention.

Referring to the example set forth in FIG. 3B, block 30 is partitioned to Ns sub-blocks 50(1)-50(Ns). Each sub-block includes a sequence of $(2^m)$ physical pages.

The first set of physical pages 40'(1) includes pages 1, $(2^m)+1, \ldots, (Ns-1)*(2^m)+1$, the second set of physical pages (not shown) includes pages 2, $(2^m)+2, \ldots, (Ns-1)*(2^m)+2$, and finally the last set $(2^m)$'th of physical pages includes pages $(Ns-1)*(2^m)+1, (Ns-1)*(2^m)+2, \ldots, Ns*(2^m)$.

In such a case, the flash memory controller may define $(2^m)$ hashing functions $h(A, t), t=1, 2, \ldots, (2^m)$, which map each logical address to one of the elements in the set $\{1, 2, \ldots, N_s\}$. A man skilled in the art can infer similar write and read flows to those presented above in a complimentary fashion.

Figure 9:
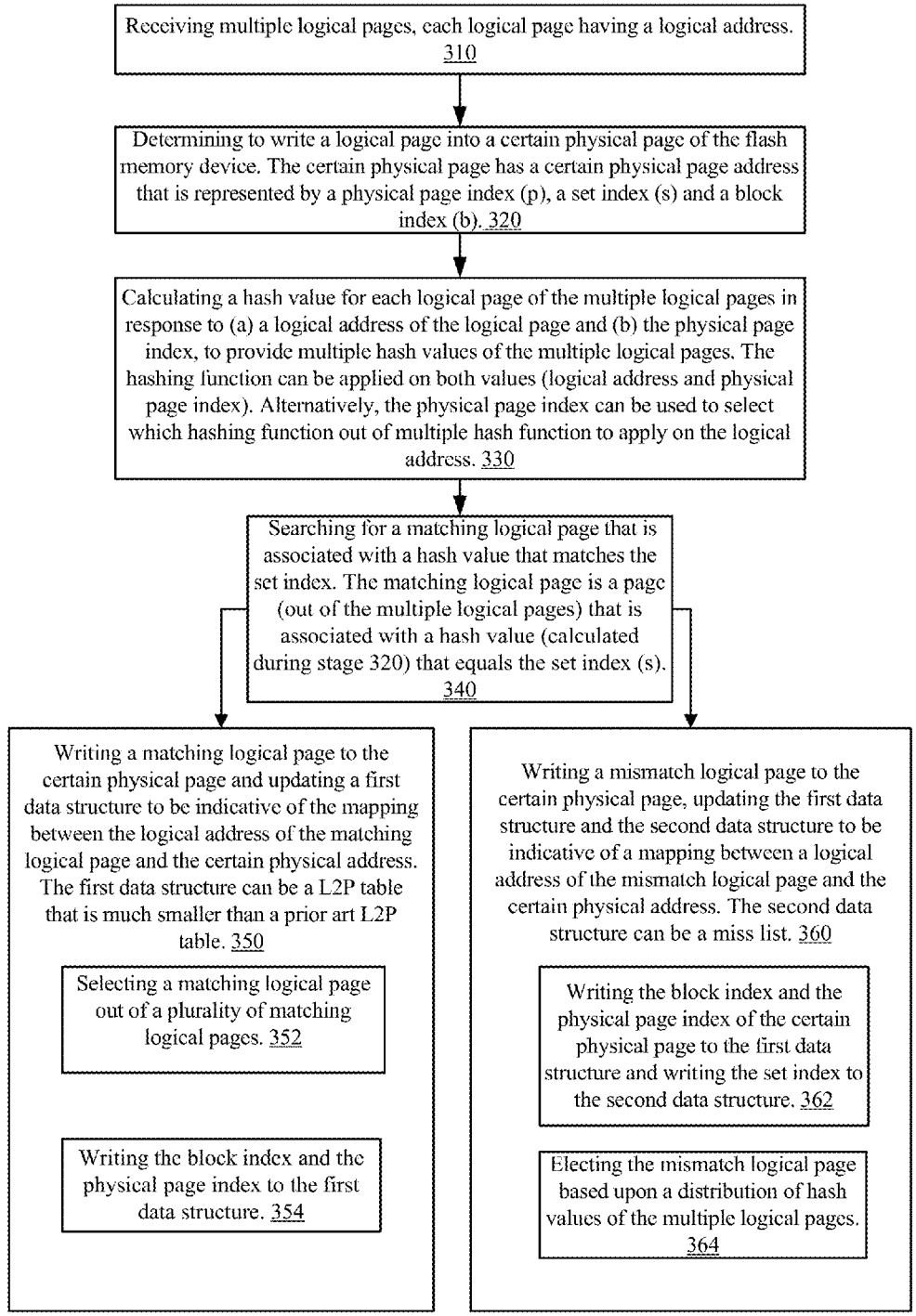
FIG. 9 illustrates a method for writing to a flash memory device according to an embodiment of the invention.

FIG. 9 illustrates method 300 for writing to a flash memory device, according to an embodiment of the invention.

Method 300 may start by stage 310 of receiving multiple logical pages, each logical page having a logical address. Stage 310 may include storing the multiple logical pages in a buffer. The buffer may be volatile or non-volatile.

Stage 310 may be followed by stage 320 of determining to write a logical page into a selected physical page of the flash memory device. The selected physical page has a selected physical page address that is represented by a physical page index (p), a set index (s) and a block index (b).

The physical page index being indicative of an order of the selected physical page within a selected set of physical pages.

The selected set of physical pages may include a consecutive sequence of physical pages. Alternatively, the selected set of physical pages may include non-consecutive physical pages that are located at a same relative position in sub-blocks of the selected block. The selected set of physical pages is being identified by the set index.

The block index is indicative of a block of the flash memory device that comprises the selected set of physical pages. The block can be written in a sequential manner and the selected physical page may be the next open physical page after the last written physical page.

Stage 320 may be followed by stage 330 of calculating a hash value for each logical page of the multiple logical pages in response to (a) a logical address of the logical page and (b) the physical page index, to provide multiple hash values of the multiple logical pages. The hashing function can be applied on both values (logical address and physical page index). Alternatively, the physical page index can be used to select which hashing function out of multiple hash function to apply on the logical address. At the end of stage 330 each logical page of the multiple logical pages has an associated hash value.

Stage 330 may be followed by stage 340 of searching for a matching logical page that is associated with a hash value that matches the set index. The matching logical page is a page (out of the multiple logical pages) that is associated with a hash value (calculated during stage 320) that equals the set index (s).

If one or more matching logical pages are found then stage 340 is followed by stage 350 of writing a matching logical page to the selected physical page and updating a first data structure to be indicative of the mapping between the logical address of the matching logical page and the selected physical address. The first data structure can be a L2P table that is much smaller than a prior art L2P table.

Stage 350 may include stage 352 of selecting a matching logical page out of a plurality of matching logical pages—if each of the plurality of matching pages is associated with a hash value that matches the set index. Thus, if a plurality of matching pages are found only one should be regarded as the matching logical page to be written to the selected physical page. The selecting of the matching logical page can be responsive to an age of each page of the plurality of pages. The oldest logical page can be selected.

Stage 350 may include stage 354 of writing the block index and the physical page index to the first data structure.

If there is a miss—there is no matching logical pages—if neither one of the multiple logical pages is associated with a hash value that matches the set index then a mismatch (or miss) is declared and stage 340 is followed by stage 360 of writing a mismatch logical page to the selected physical page, updating the first data structure and the second data structure to be indicative of a mapping between a logical address of the mismatch logical page and the selected physical address. The second data structure can be a miss list.

Stage 360 may include stage 362 of writing the block index and the physical page index of the selected physical page to the first data structure and writing the set index to the second data structure.

Stage 360 may include stage 364 of electing the mismatch logical page based upon a distribution of hash values of the multiple logical pages. Stage 362 may include electing the mismatch logical page out of a largest group of logical pages that share a same has value.

Some examples of the execution of method 300 are illustrated in table 1. It is assumed that a logical page should be written to a sequence of physical pages of the s'th set of physical pages—starting from the p'th physical page of the s'th set of physical pages of the b'th block of the flash memory device and that a buffer stores five logical pages PI(1)-PI(5) that have logical addresses A1-A5.

The right most column indicates how the second data structure DS2 is updated (if updated at all). The second column to the right indicates how the first data structure DS1 is updated. The third column indicates which logical page is written to the available physical page. The fourth column indicates if there is a match (+) or not—if there were found at least one matching page or not. The leftmost column is indicative of the physical page that is being written—starting from the p'th physical page of the s'th set of physical pages and ending by the (p+4)'th physical page of the s'th set of physical pages. The fifth till ninth columns are indicative of the hash values generated during each iteration.

TABLE 1

| Page index | Hash value of (physical page index, logical address) | | | | | M | WR | DS1 | DS2 |
| --- | --- | --- | --- | --- | --- | --- | --- | --- | --- |
| | PI(1) | PI(2) | PI(3) | PI(4) | PI(5) | | | | |
| p | S | S + 1 | S + 3 | S − 4 | S + 5 | + | PI(1) | A1,b | — |
| (p + 1) | — | S | S | S + 2 | S − 7 | + | PI(3) | A3,b | — |
| (p + 2) | — | S + 2 | — | S + 1 | S + 1 | − | PI(4) | A4,b | S + 1 |
| (p + 3) | — | S | — | — | S + 2 | + | PI(2) | A2,b | — |
| (p + 4) | — | — | — | — | S | + | PI(5) | S5,b | — |

Figure 10:
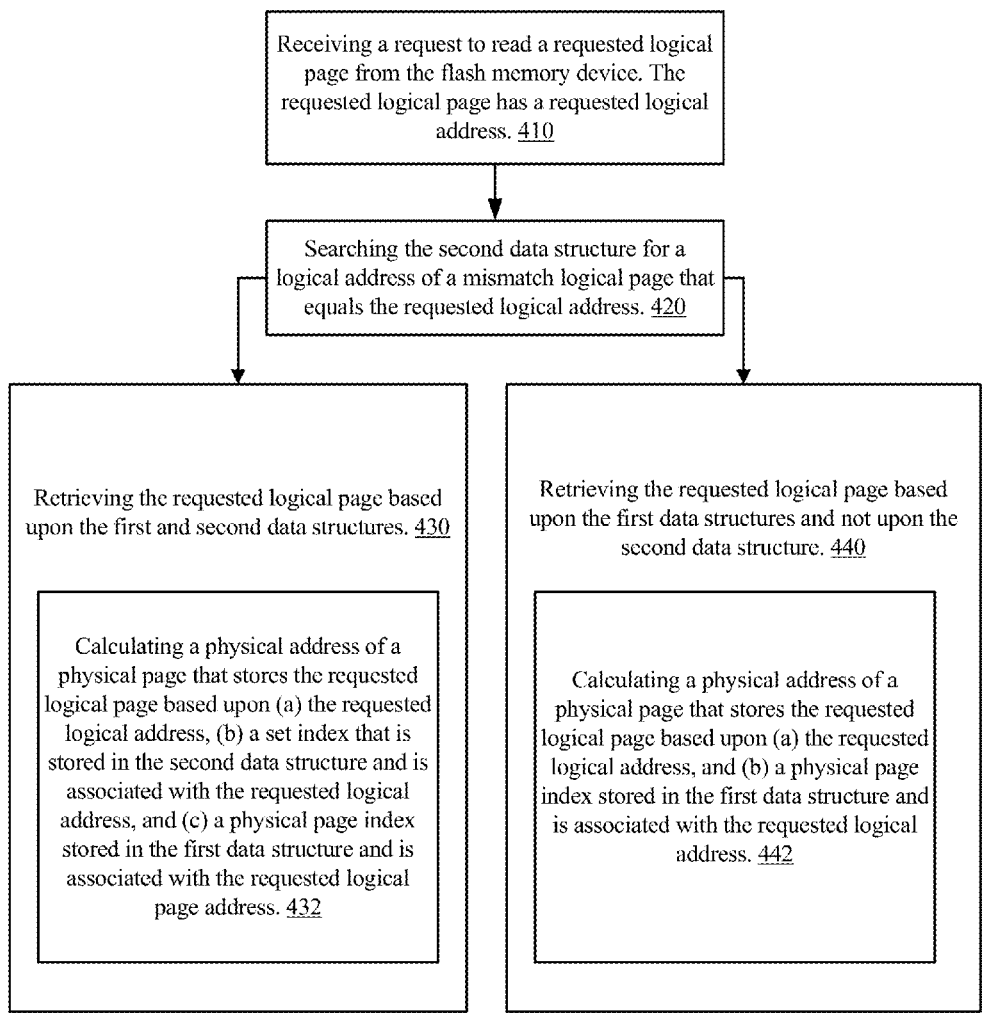
FIG. 10 illustrates a method for reading from a flash memory device according to an embodiment of the invention.

FIG. 10 illustrates method 400 for reading from a flash memory device, according to an embodiment of the invention.

Method 400 may start by stage 410 of receiving a request to read a requested logical page from the flash memory device. The requested logical page has a requested logical address.

Stage 410 may be followed by stage 420 of searching the second data structure for a logical address of a mismatch logical page that equals the requested logical address.

If it is determined (the outcome of the searching) that the second data structure includes a logical address of a mismatch logical page that equals the requested logical address then stage 420 may be followed by stage 430 of retrieving the requested logical page based upon the first and second data structures.

Stage 430 may include stage 432 of comprising calculating a physical address of a physical page that stores the requested logical page based upon (a) the requested logical address, (b) a set index that is stored in the second data structure and is associated with the requested logical address, and (c) a physical page index stored in the first data structure and is associated with the requested logical page address.

If it is determined (the outcome of the searching) that the second data structure does not include a logical address of a mismatch logical page that equals the requested logical address then stage 420 may be followed by stage 440 of retrieving the requested logical page based upon the first data structures and not upon the second data structure.

Stage 440 may include stage 442 of calculating a physical address of a physical page that stores the requested logical page based upon (a) the requested logical address, and (b) a physical page index stored in the first data structure and is associated with the requested logical address.

Any methods illustrated above can be combined and any combination of any stages of any method mentioned above may be combined.

According to some embodiments of this invention, the amount of memory which is saved in representing the L2P tables for a given number of bits reduced from the L2P entry and for a given buffer size is given by:

$$S(m, L) = \alpha \cdot m - \beta \cdot L - \gamma \cdot \left(1 - \frac{1}{2^m}\right)^L$$

where $\alpha$, $\beta$, and $\gamma$ are constants which depend on the SSD's parameters, and where the first term is the amount of memory which is reduced from the L2P table due to removing m bits from each L2P entry, the second term is the amount of memory occupied by the buffer, and the third term is the amount of memory which is required for the page miss list.

Given a number of reduced bits from the L2P entry, the value of the buffer size L which maximizes the memory saving is given by $$L^* = \frac{\log\left(\frac{c}{b}\log\left(\frac{2^m}{2^m-1}\right)\right)}{\log\left(\frac{2^m}{2^m-1}\right)}.$$

According to some embodiments of this invention, the maximum memory saving is obtained by performing the maximization $$\max_m S(m, L*),$$

where the maximization is performed over all values of m which satisfy the following constraints: $0<m<=\log_2(N_p)$, and $2^{(32-m)}>=U/P^*(1-1/2^m)^{L^*}$, where the first constraint ensures that bit removal is done only from the page address field in the L2P entry (see FIG. 2), and the second constraint ensures that the "pointer to next record" field in each record of the page miss list is large enough (see FIG. 7).

According to some embodiments of this invention, for the SSD example above, the constants $\alpha$, $\beta$, and $\gamma$ are given by $$\alpha = \frac{U}{P*8 \wedge 20}$$
$$= \frac{256*10 \wedge 9}{4*2 \wedge 10*8*2 \wedge 20} = 7.45 \left[\frac{MB}{\text{reduced bit}}\right]$$

$$\beta = \frac{P}{2 \wedge 20}$$
$$= \frac{4*2 \wedge 10}{2 \wedge 20} = 0.0039 \left[\frac{MB}{\text{page}}\right]$$

$$\gamma = \frac{U*8}{P*2 \wedge 20}$$

-continued
$$= \frac{256*10 \wedge 9*8}{4*2 \wedge 10*2 \wedge 20} = 4777 \ [MB]$$

Where in the calculation of $\alpha$, "$8*2^{20}$" accounts for translating bit units to MB units, in the calculation of $\beta$, "$2^{20}$" accounts for translating byte units to MB units, and in the calculation of $\gamma$, the "8" accounts for the number of bytes allocated to each record in the miss list (4 bytes for the logical page address, m bits for the set of physical pages to which the page was actually written, and the remaining 32-m bits for pointing to the next record in the list) and "$2^{20}$" accounts for translating byte units to MB units $$L^* = \frac{\log\left(\frac{c\log\frac{2^m}{2^m-1}}{b}\right)}{\log\left(\frac{2^m}{2^m-1}\right)}$$

Figure 11:
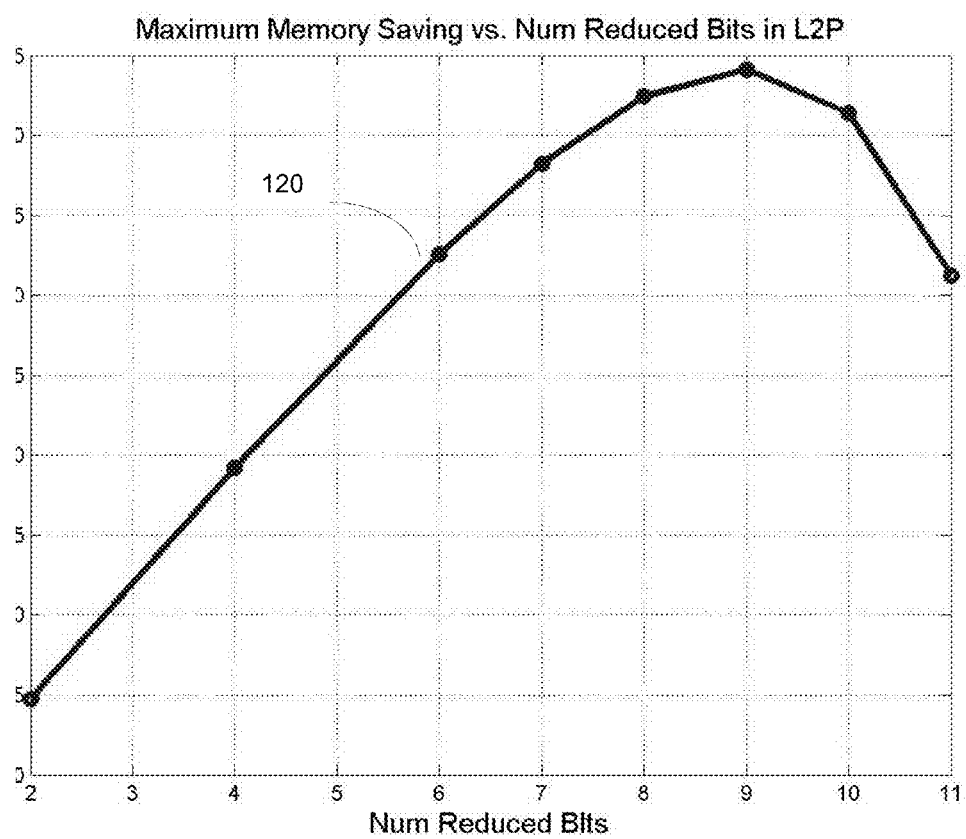
FIG. 11 illustrates an example of relationship between memory saving and a size of an entry of a first data structure according to an embodiment of the invention.

FIG. 11 depicts the amount of memory saving due to reducing 2 till 11 bits (m ranges between 2 and 11) from the page address field of the L2P entry. It is seen that the maximum memory saving is obtained for m=9, the amount of memory saved is 54 MB, and the required buffer size is L=2800. It can be verified that this value of m satisfies both constraints above.

According to some embodiments of this invention, if constraint 2 above is met with a strict inequality, and such that $32-m > \log2(U/P^*(1-1/2^m)^L^*)+1$, the memory saving associated with the L2P table may be further increased by reducing the amount of memory required for each entry of the miss list by floor $(32-m-\log2(U/P^*(1-1/2^m)^L^*))$.

For example, in the example above $32-m=23$ and $\log2(U/P^*(1-1/2^m)^L^*)=17.99$.

An additional saving of 5 bits per miss page entry is possible, which is equivalent to a saving of $5*(U/P)*(1-1/2^m)^L^*/(8*2^{20})=0.1562$ MB, where in the above calculation, "$8*2^{20}$" is used to translate bit units to MB units.

Figure 12:
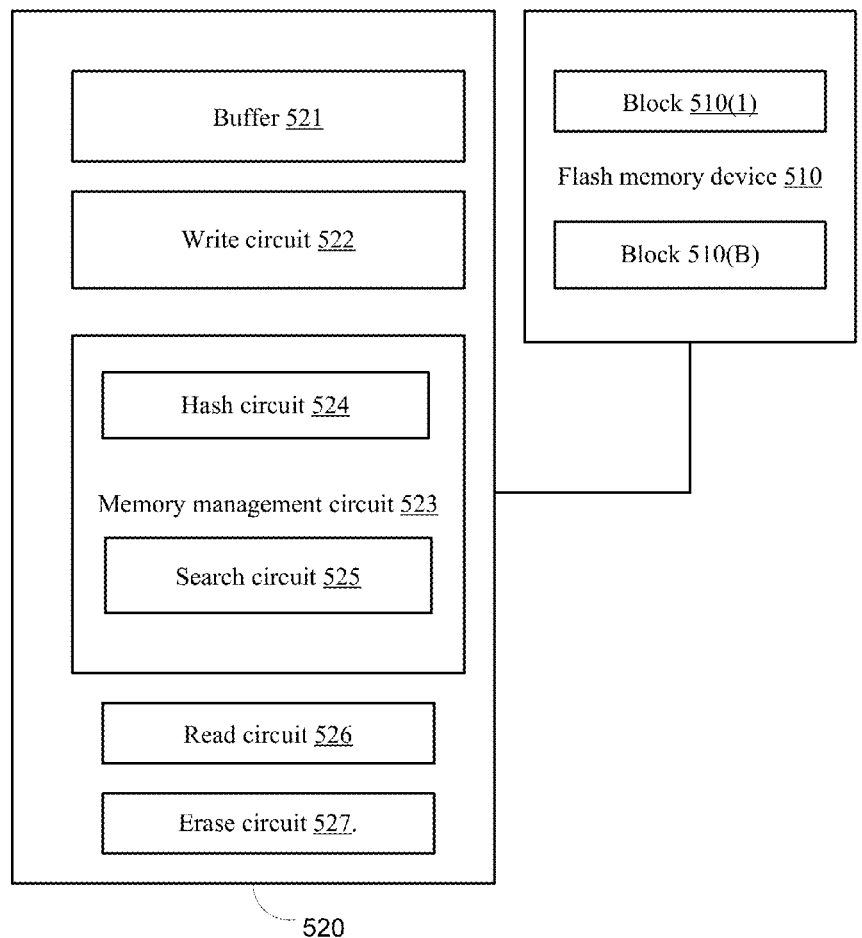
FIG. 12 illustrates a system according to an embodiment of the invention.

Additional embodiments of the invention include a system arranged to execute any or all of the methods described above, including any stages—and any combinations of same. FIG. 12 illustrates a system 500 according to an embodiment of the invention.

System 500 includes a flash memory device 510 and a flash memory controller 520. The flash memory device 510 is illustrated as including multiple blocks 510(1)-510(B). It may include one or more flash memory dies.

The flash memory controller 520 may include a buffer 521 (volatile or non-volatile), a write circuit 522, a read circuit 526, and a erase circuit 527.

The flash memory controller 520 may include a memory management circuit 523 that may include a hash circuit 524 and a search circuit 525. The read circuit 526 may include the memory management circuit 523, the read circuit 526 may include the memory management circuit 523. Each one of the read circuit 526 and the write circuit 522 can include the memory management circuit 523. Alternatively, neither one of the read circuit 526 and the write circuit 522 may include the memory management circuit 523.

The buffer 521 may be arranged to receive and store multiple logical pages, each logical page having a logical address.

The write circuit 522 may be arranged to determine to write a logical page into a selected physical page of a flash memory device that is coupled to the flash memory controller, the selected physical page has a selected physical page address that is represented by a physical page index, a set index and a block index; the physical page index being indicative of an order of the selected physical page within a selected set of physical pages, the selected set of physical pages is being identified by the set index, the block index is indicative of a block of the flash memory device that comprises the selected set of physical pages.

The hash circuit 524 may be arranged to calculate a hash value for each logical page of the multiple logical pages in response to (a) a logical address of the logical page and (b) the physical page index, to provide multiple hash values of the multiple logical pages.

The search circuit 525 may be arranged to search for a matching logical page that is associated with a hash value that matches the set index.

The write circuit 526 may be arranged to write the matching logical page to the selected physical page, update a first data structure to be indicative of a mapping between a logical address of the matching logical page and the selected physical address; and write a mismatch logical page to the selected physical page, updating the first data structure and the second data structure to be indicative of a mapping between a logical address of the mismatch logical page and the selected physical address—if neither one of the multiple logical pages is associated with a hash value that matches the set index.

The erase circuit 527 may erase blocks of the flash memory device.

The read circuit 526 may be arranged to receive a request to read a requested logical page from the flash memory device, the requested logical page has a requested logical address.

The search circuit 525 may be arranged to search the second data structure for a logical address of a mismatch logical page that equals the requested logical address.

The hash circuit 524 may be arranged to assign in calculating the physical address of the physical page that stores the requested logical page.

The read circuit 526 may be arranged to retrieve the requested logical page based upon the first and second data structures if it is determined that the second data structure includes a logical address of a mismatch logical page that equals the requested logical address.

The read circuit 526 may be arranged to retrieve the requested logical page based upon the first data structures and not upon the second data structure if it is determined that the second data structure does not comprise a logical address of a mismatch logical page that equals the requested logical address.

The hash circuit 524 may be arranged to assist in calculating the physical address of a physical page that stores the requested logical page based upon (a) the requested logical address, (b) a set index that is stored in the second data structure and is associated with the requested logical address, and (c) a physical page index stored in the first data structure and is associated with the requested logical page address, if it determines that the second data structure includes the logical address of the mismatch logical page that equals the requested logical address.

The hash circuit 526 may be arranged to assist in calculating a physical address of a physical page that stores the requested logical page based upon (a) the requested logical address, and (b) a physical page index stored in the first data structure and is associated with the requested logical address, if it determines that the second data structure does not comprise a logical address of a mismatch logical page that equals the requested logical address.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for writing to a flash memory device, the method comprising:
receiving multiple logical pages, each logical page having a logical address;
determining to write a logical page into a selected physical page of the flash memory device, the selected physical page has a selected physical page address that is represented by a physical page index, a set index and a block index; the physical page index being indicative of an order of the selected physical page within a selected set of physical pages, the selected set of physical pages is being identified by the set index, the block index is indicative of a block of the flash memory device that comprises the selected set of physical pages;
calculating a hash value for each logical page of the multiple logical pages in response to (a) a logical address of the logical page and (b) the physical page index, to provide multiple hash values of the multiple logical pages;

searching for a matching logical page that is associated with a hash value that matches the set index;

writing the matching logical page to the selected physical page and updating a first data structure to be indicative of a mapping between a logical address of the matching logical page and the selected physical address; and writing a mismatch logical page to the selected physical page, updating the first data structure and the second data structure to be indicative of a mapping between a logical address of the mismatch logical page and the selected physical address, if neither one of the multiple logical pages is associated with a hash value that matches the set index.

2. The method according to claim 1, wherein the updating of the first data structure and the second data structure comprises writing the physical page index of the selected physical page to the first data structure and writing the set index to the second data structure.

3. The method according to claim 1, comprising selecting a matching logical page out of a plurality of matching logical pages.

4. The method according to claim 3, comprising selecting the matching logical page in response to an age of each of the plurality of matching logical pages.

5. The method according to claim 1, comprising electing the mismatch logical page based upon a distribution of hash values of the multiple logical pages.

6. The method according to claim 5, comprising selecting the mismatch logical page out of a largest group of logical pages that share a same hash value.

7. The method according to claim 1, wherein the selected set of physical pages comprises a consecutive sequence of physical pages.

8. The method according to claim 1, wherein the selected set of physical pages comprises non-consecutive physical pages that are located at a same relative position in sub-blocks of the selected block.

9. The method according to claim 1, comprising storing the multiple logical pages in a buffer before writing to the selected physical page.

10. The method according to claim 9, wherein the multiple logical pages fill the buffer.

11. The method according to claim 9, wherein the multiple logical pages partially fill the buffer.

12. The method according to claim 1, comprising:

receiving a request to read a requested logical page from the flash memory device, the requested logical page has a requested logical address;

searching the second data structure for a logical address of a mismatch logical page that equals the requested logical address;

retrieving the requested logical page based upon the first and second data structures if it is determined that the second data structure comprises a logical address of a mismatch logical page that equals the requested logical address; and retrieving the requested logical page based upon the first data structures and not upon the second data structure if it is determined that the second data structure does not comprise a logical address of a mismatch logical page that equals the requested logical address.

13. The method according to claim 12, comprising calculating a physical address of a physical page that stores the requested logical page based upon (a) the requested logical address, (b) a set index that is stored in the second data structure and is associated with the requested logical address, and (c) a physical page index stored in the first data structure and is associated with the requested logical page address, if it is determined that the second data structure comprises the logical address of the mismatch logical page that equals the requested logical address.

14. The method according to claim 12, comprising calculating a physical address of a physical page that stores the requested logical page based upon (a) the requested logical address, and (b) a physical page index stored in the first data structure and is associated with the requested logical address, if it is determined that the second data structure does not comprise a logical address of a mismatch logical page that equals the requested logical address.

15. A non-transitory computer readable medium that stores instructions comprising:

receiving multiple logical pages, each logical page having a logical address;

determining to write a logical page into a selected physical page of the flash memory device, the selected physical page has a selected physical page address that is represented by a physical page index, a set index and a block index; the physical page index being indicative of an order of the selected physical page within a selected set of physical pages, the selected set of physical pages is being identified by the set index, the block index is indicative of a block of the flash memory device that comprises the selected set of physical pages;

calculating a hash value for each logical page of the multiple logical pages in response to (a) a logical address of the logical page and (b) the physical page index, to provide multiple hash values of the multiple logical pages;

searching for a matching logical page that is associated with a hash value that matches the set index;

writing the matching logical page to the selected physical page and updating a first data structure to be indicative of a mapping between a logical address of the matching logical page and the selected physical address; and writing a mismatch logical page to the selected physical page, updating the first data structure and the second data structure to be indicative of a mapping between a logical address of the mismatch logical page and the selected physical address—if neither one of the multiple logical pages is associated with a hash value that matches the set index.

16. The non-transitory computer readable medium according to claim 15, wherein the updating of the first data structure and the second data structure comprises writing the physical page index of the selected physical page to the first data structure and writing the set index to the second data structure.

17. The non-transitory computer readable medium according to claim 15 that stores instructions for selecting a matching logical page out of a plurality of matching logical pages.

18. The non-transitory computer readable medium according to claim 17 that stores instructions for comprising selecting the matching logical page in response to an age of each of the plurality of matching logical pages.

19. The non-transitory computer readable medium according to claim 15 that stores instructions for electing the mismatch logical page based upon a distribution of hash values of the multiple logical pages.

20. The non-transitory computer readable medium according to claim 19 that stores instructions for selecting the mismatch logical page out of a largest group of logical pages that share a same hash value.

21. The non-transitory computer readable medium according to claim 15, wherein the selected set of physical pages comprises a consecutive sequence of physical pages.

22. The non-transitory computer readable medium according to claim 15, wherein the selected set of physical pages comprises non-consecutive physical pages that are located at a same relative position in sub-blocks of the selected block.

23. The non-transitory computer readable medium according to claim 15 that stores instructions for storing the multiple logical pages in a buffer before writing to the selected physical page.

24. The non-transitory computer readable medium according to claim 23, wherein the multiple logical pages fill the buffer.

25. The non-transitory computer readable medium according to claim 23 wherein the multiple logical pages partially fill the buffer.

26. The non-transitory computer readable medium according to claim 15, that stores instructions comprising:
  receiving a request to read a requested logical page from the flash memory device, the requested logical page has a requested logical address;
  searching the second data structure for a logical address of a mismatch logical page that equals the requested logical address;
  retrieving the requested logical page based upon the first and second data structures if it is determined that the second data structure comprises a logical address of a mismatch logical page that equals the requested logical address; and
  retrieving the requested logical page based upon the first data structures and not upon the second data structure if it is determined that the second data structure does not comprise a logical address of a mismatch logical page that equals the requested logical address.

27. The non-transitory computer readable medium according to claim 26 that stores instructions for calculating a physical address of a physical page that stores the requested logical page based upon (a) the requested logical address, (b) a set index that is stored in the second data structure and is associated with the requested logical address, and (c) a physical page index stored in the first data structure and is associated with the requested logical address, if it is determined that the second data structure comprises the logical address of the mismatch logical page that equals the requested logical address.

28. The non-transitory computer readable medium according to claim 26, that stores instructions for calculating a physical address of a physical page that stores the requested logical page based upon (a) the requested logical address, and (b) a physical page index stored in the first data structure and is associated with the requested logical address, if it is determined that the second data structure does not comprise a logical address of a mismatch logical page that equals the requested logical address.

29. A flash memory controller, comprising:
  a buffer arranged to receive and store multiple logical pages, each logical page having a logical address;
  a write circuit arranged to determine to write a logical page into a selected physical page of a flash memory device that is coupled to the flash memory controller, the selected physical page has a selected physical page address that is represented by a physical page index, a set index and a block index; the physical page index being indicative of an order of the selected physical page within a selected set of physical pages, the selected set of physical pages is being identified by the set index, the block index is indicative of a block of the flash memory device that comprises the selected set of physical pages;
  a hash circuit arranged to calculate a hash value for each logical page of the multiple logical pages in response to (a) a logical address of the logical page and (b) the physical page index, to provide multiple hash values of the multiple logical pages;
  a search circuit arranged to search for a matching logical page that is associated with a hash value that matches the set index;
  wherein the write circuit is arranged to
  write the matching logical page to the selected physical page and updating a first data structure to be indicative of a mapping between a logical address of the matching logical page and the selected physical address; and
  write a mismatch logical page to the selected physical page, updating the first data structure and the second data structure to be indicative of a mapping between a logical address of the mismatch logical page and the selected physical address—if neither one of the multiple logical pages is associated with a hash value that matches the set index.

* * * * *